United States Patent [19]

Sharps, Jr.

[11] Patent Number: 4,683,094
[45] Date of Patent: Jul. 28, 1987

[54] PROCESS FOR PRODUCING ORIENTED POLYOLEFIN FILMS WITH ENHANCED PHYSICAL PROPERTIES

[75] Inventor: Gordon V. Sharps, Jr., Fairport, N.Y.

[73] Assignee: Mobil Oil Corporation, New York, N.Y.

[21] Appl. No.: 712,948

[22] Filed: Mar. 18, 1985

[51] Int. Cl.$^4$ .................. B29C 47/02; B29C 47/90
[52] U.S. Cl. ........................... 264/38; 264/514; 264/557; 264/562; 264/567; 264/178 R; 264/237; 264/173; 264/179; 425/71; 425/326.1; 425/378 R
[58] Field of Search ............... 264/564, 557, 562, 567, 264/237, 173, 348, 209.5, 178 R, 514, 519, 38; 425/326.1, 71, 378 R

[56] References Cited

U.S. PATENT DOCUMENTS

| | | |
|---|---|---|
| 2,941,254 | 6/1960 | Swerlick .................... 264/178 R |
| 2,987,776 | 6/1961 | Miller et al. .................. 264/562 |
| 3,121,760 | 2/1964 | Kline ......................... 264/209.5 |
| 3,193,547 | 7/1965 | Schott, Jr. ..................... 264/562 |
| 3,239,588 | 3/1966 | Berggren et al. ............. 264/209.5 |
| 3,337,663 | 8/1967 | Taga ......................... 425/326.1 |
| 3,340,338 | 9/1967 | Meissner .................... 425/326.1 |
| 3,388,197 | 6/1968 | Samways .................... 425/326.1 |
| 3,427,375 | 2/1969 | Turner ...................... 425/326.1 |
| 3,576,929 | 4/1971 | Turner et al. ................. 264/237 |
| 4,003,973 | 1/1977 | Kurokawa et al. ............... 425/71 |

FOREIGN PATENT DOCUMENTS

| | | | |
|---|---|---|---|
| 685170 | 4/1964 | Canada ..................... 264/178 R |
| 43-17817 | 7/1968 | Japan ........................ 264/178 R |
| 322273 | 2/1972 | U.S.S.R. ........................ 264/562 |

OTHER PUBLICATIONS

"Tubular Water-Bath System Becomes Active Contender in the Film Sweepstakes", *Plastics World*, pp. 54–56 (Jan. 1973).
"Liquid Quenching of Blown Film: A Challenge to Air Cooling," *Plastics Machinery & Equipment*, date unknown.
"Film Profits Improved by Cold Baths," *Plastics & Rubber Weekly*, pp. 19 and 20 (Nov. 17, 1972).

*Primary Examiner*—Jeffery Thurlow
*Attorney, Agent, or Firm*—Alexander J. McKillop; Michael G. Gilman; Charles J. Speciale

[57] ABSTRACT

An improved method for the production of polyolefin film by extruding molten film from an annular die in a tubular form into an extrusion zone is disclosed wherein physical properties are enhanced by controlling polymeric crystalline growth. The method includes providing a liquid quench medium maintained at a constant temperature range in the extrusion zone immediately adjacent the annular die, extruding the molten film directly into the liquid quench medium, and then orienting the quenched film in a tubular bubble whereby the size and amount of crystalline growth is controlled.

2 Claims, 1 Drawing Figure

PROCESS FOR PRODUCING ORIENTED POLYOLEFIN FILMS WITH ENHANCED PHYSICAL PROPERTIES

BACKGROUND OF THE INVENTION

The present invention relates to the art of making polyolefin films, and, in particular, to a process for enhancing the physical characteristics of such film by controlling the crystalline growth during film formation.

Films made of polyolefins, such as polypropylene, polyethylene, polyethylene terephthalate or other such polymers are in great demand in both the industrial and consumer marketplace because of their great strength and toughness, especially when they have been biaxially stretched. However, such films possess certain characteristics which can result in a defective end product because of processing requirements. For example, uncontrolled crystalline growth which can occur during film formation may detract from the desired film product. Specifically, such uncontrolled crystalline growth can detract from the optic quality of the film as well as reduce the tensile strength of the film.

In the past it has been known to use high-speed tubular water-bath process for production of polypropylene, high-density polyethylene (HDPE), low-density polyethylene (LDPE), nylon and other polymers, especially since the production rate can be as much as two or three times greater than other methods, e.g., air blown or chill roll, in which production speed is held down by cooling requirements. The tubular water-bath process has combined the air-blown process with chill roll or conventional water-bath process for commercial production of film and, generally, includes drawing a bubble of molten film over a large-diameter mandrel from which airstreams blown therethrough extend the film to the desired diameter. When the designated orientation diameter is reached, the film is plunged into a cold-water bath. Another stream of cold water can be within the mandrel whereby the mandrel's metal skin is cooled. The cold water on one side of the extruded film and the water-cooled mandrel on the other greatly accelerate the cooling process.

Another process known as the Dow-Taga process teaches a downward extrusion of film from a tubular die, followed by inflation of the tubular bubble to obtain the required layflat width. The film bubble is first stabilized by an air ring about 200 mm below the die, after which the film is sized and cooled with a water ring located about 300 mm below the air ring. Once the film is formed it can be collapsed, such as by use of collapsing boards, dried and wound.

In all the known prior art processes, crystallization is relatively uncontrolled since a high degree of orientation is imparted during expansion while the film is at or above the glass transition temperature, Tg. Consequently, it is very difficult to impart different desired enhanced physical characteristics; thus, these processes have not been considered commercially significant.

As a result of the present invention, however, a tubular blown polyolefin film can be produced on a commercial scale with highly controlled crystallization whereby process-incurred defective physical characteristics such as those as set forth above can be overcome.

SUMMARY OF THE INVENTION

The present invention is an improvement in a method for the production of polyolefin film by extrusion of molten film from an annular die in a tubular form into an extrusion zone, whereby the physical properties are enhanced by controlling crystalline growth in the film. The method includes providing a liquid quench medium maintained at a constant temperature range in the extrusion zone immediately adjacent the annular orifice of the annular die, extruding the molten film directly into the liquid quench medium, and orienting the film in a tubular bubble whereby the film is quenched with controlled crystalline growth. The improved method of the present invention can include an upward extrusion of the tubular molten film over an internal mandrel after which the film is slit to form a layflat sheet, however, the present preferred mode is directed to a free orientation bubble which does not include an internal support such as a mandrel.

Polyolefin film prepared in accordance with the present invention preferably has a thickness of from about 0.5 mils to about 3 mils. The liquid quench medium can be maintained at a temperature of from about 150° F. to about 200° F. and is preferably provided on the exterior of the extruded tubular form as a bath maintained at a depth of from about 0.25 inches to about 1 inches. One preferred embodiment of the invention is directed to polyethylene film while the liquid quench medium is water. The liquid quench medium can also include coating material for deposition on the film as it is extruded and quenched.

Furthermore, if required for higher control of crystalline growth and/or coating on both sides of the film, liquid quench medium can be provided on the exterior and the interior of the tubular form at a depth of from about 3 to about 4 inches so long as balanced hydrostatic pressure is maintained on the thin film. As with the previous embodiment, the liquid quench medium can be water and can also include coating material for depositing on both sides of the film.

In order to maintain the liquid quench medium at the desired temperature range, the present invention can include continual circulation of the medium through heating and cooling means and thence to the extrusion zone so that the temperature of the medium is continually adjusted to the desired temperature range. This type of temperature control is exercised in combination with the continuous heat transfer from the molten exturded film to the cooling medium. Inasmuch as there is a constant heat imparted to the cooling medium by the extruded molten film the medium is preferably circulated through the extrusion zone at the throughput rate of from about 1.5 to about 5.0 part by weight of liquid quench medium per part of film of throughput. The maximum temperature difference between the liquid quench medium at the inlet and the outlet of the extrusion zone is preferably not more than about 5° F., and most preferably not more than about 3° F. under steady state conditions.

The present invention also includes a polyolefin film having enhanced physical properties which results from the controlled crystalline growth which has been produced in accordance with the method set forth above.

As a result of the present invention a polyolefin film sheet can be produced having only small crystalline growth which then can be oriented as desired in further and other processing procedures. Consequently, the film optic quality can be highly controlled and the tensile strength can be significantly increased, such as by radically shifting the density of the film material and thereby increasing toughness or tear properties.

Basically, by quenching first and then effecting blow-up orientation the film can then be reheated and oriented under controlled conditions by increasing the temperature up to the Tg, rather than by lowering the temperature to the Tg which causes loss of control. This provides a means for maintaining the temperature at the desire level for the most effective orientation.

For a better understanding of the present invention, together with other and further objects, references made to the following description taken in conjunction with the accompanying drawings, and its scope will be pointed out in the appended claims.

DETAILED DESCRIPTION OF THE SPECIFIC EMBODIMENTS

Figure 1:
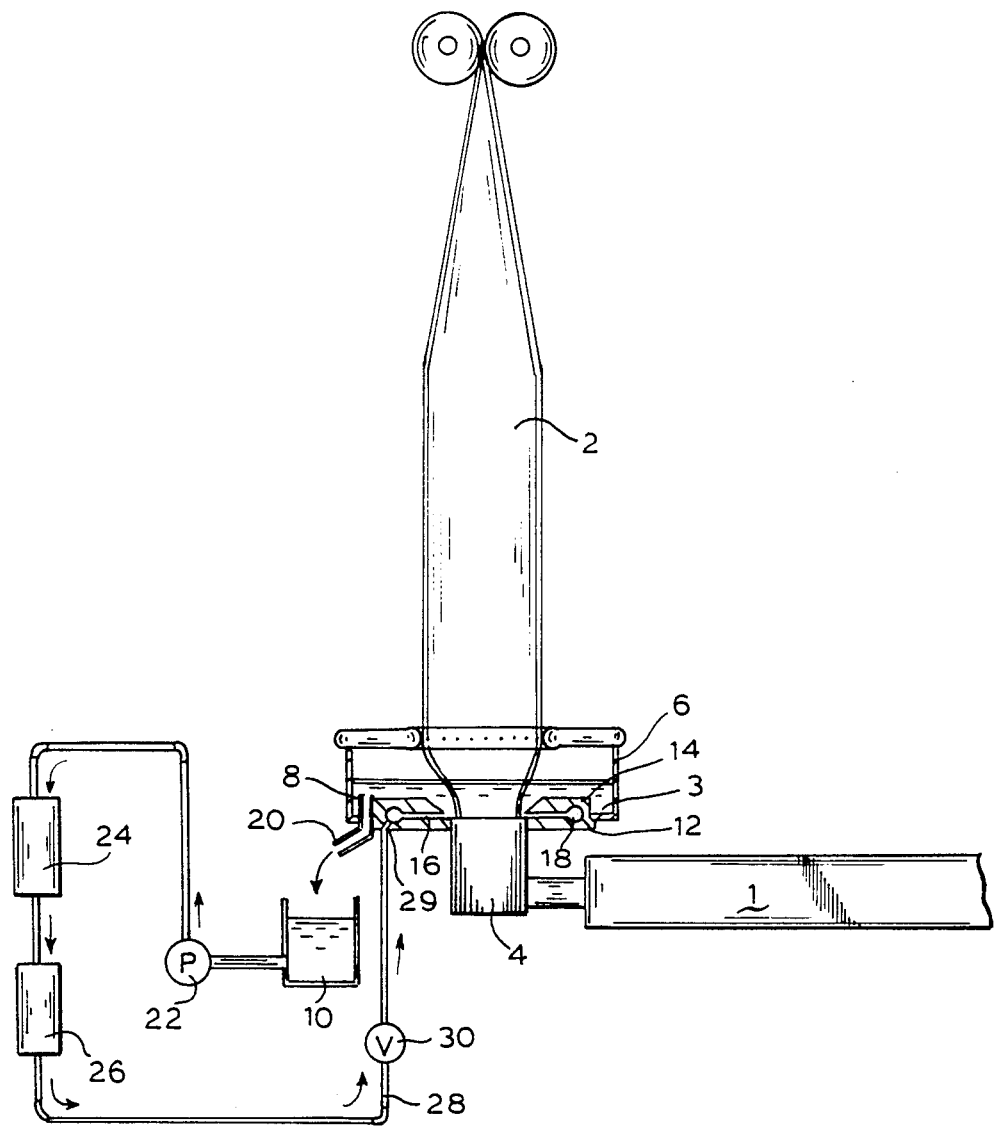
FIG. 1 is a schematic of the process of the present invention in which part of the apparatus is shown in cross section.

Referring to the drawing, reference numeral 1 represents an extruder of conventional design from which a melt of molten polyolefin material is extruded through an upwardly oriented annular die 4 in the form of a seamless tube 2. The seamless tube is inflated to form a bubble by means of a gas such as air introduced to the interior of the tube.

According to the present invention, molten polyolefinic polymer, can be extruded up through the annular die means 4 through an extrusion die orifice and contacted immediately with a liquid quench medium 3 such as water, which can be maintained at a desired constant temperature range of from about 150° F. to about 200° F., and preferably 160° F. to about 170° F. The polyolefin melt temperature can be maintained at a temperature of about 375° F. to about 450° F., and preferably from about 400° F. to about 425° F. The preferred extrusion die temperatures range from about 375° F. up to about 450° F. up, and preferably from about 400° F. up to about 425° F. for polyethylene.

The present method is particularly advantageous over other techniques in that it requires a simple water distribution syste in order to provide uniform controlled quenching rate so that high polymer output results. In particular, the quench medium is provided immediately adjacent the annular die orifice by means of a bath or enclosure 6 in which the depth of the medium can be regulated by an adjustable weir 8.

In one embodiment of the invention the liquid quench medium is provided on the exterior of the tubular form 2 and at a depth of from about 0.25 to about 1.0 inches. This is accomplished by merely raising or lowering the weir to effect overflow therein, after which the fluid is directed via line 20 to a reservoir tank 10.

Another embodiment can include the use of a quench medium on both the exterior and the interior of the tubular extrusion, provided, however, that in the case of thin film such as polyolefin films having a thickness of from about 0.5 to about 3 mils, a balanced hydrostatic condition is maintained. In this latter case the depth of the medium can be from about 3 to about 4 inches. In both embodiments it is also contemplated that in addition to a medium such as water, various aqueous coatings can be added to the system to give a uniform coating on the emerging extrudate. Such coatings could be used to enhance printing, heat sealing, to provide color or appearance, or improve physical properties.

Basically, since the film extrudate is so thin, heat transfer therethrough is very good, so that sufficient quenching can be achieved by using a shallow exterior water bath only rather than an interior and exterior bath.

In order to provide the liquid quench constantly to the reservoir 6, at a location immediately adjacent the annular orifice, the annular extrusion die 4 can be surrounded and insulated by a lower water ring 12 which can be fitted to an upper water ring 14 to form an annular gap 16 as well as a water distribution plenum 18.

A constant temperature range is maintained in the liquid quench medium by continually adjusting the temperature thereof through an ancillary system including a water return line 20 which directs the overflow water into reservoir 10, and a pump 22 which takes the water and pumps it through a heater 24 and thence to a cooler 26 to maintain the medium at a preselected temperature range. Water is then supplied to the annular water distribution plenum 18 through a line 28 and an entry port 29 which is in fluid communication with distribution plenum 18, while the flow is regulated by a valve 30. Since the quenching medium is continually heated by contact with the molten extrudate, continual adjustment of the temperature must be effected. Various control means can be utilized to adjust the separate elements to maintain the medium at the desired temperature range.

In order to maintain close control of the cooling or quenching process, a relatively high amount of liquid quench medium is circulated through the extrusion zone in contact with the molten extrudate. The mass flow rate of the medium can be sufficiently high to prevent substantial temperature increase and/or boiling of the medium. In general, a water temperature difference of less than about 5° F., and preferably less than 3° F., between the coolant inlet and outlet can be achived with high coolant throughput.

Product quality can be enhanced by maintaining the extrudate temperature carefully. Since a significant amount of heat transfer can occur between the hot die and the cool liquid bath at their interface, thus cooling the die excessively, improved extrudate temperature control can be achieved by thermally isolating the die face. In view of the frequency and severity of thermal changes in the equipment, a durable insulated material is desirable for the die face. Concentric ring thermal insulators adjacent to the die orifice can be provided at the die face surfaces in contact with the liquid bath. Suitable insulating materials include ceramics and plastics. Metal oxides, such as aluminum, xerconia, xerconite or the like may be formed in the desired shape and adapted for mounting on the die face. Temperature resistant epoxy resin filled with hollow glass microspheres is an excellent insulator that is also durable. Typically a steel die with about 1 millimeter or less of thermal insulation will be adequate to control die and extrudate temperature.

As a result of utilization of the process as described herein, it has been found that polyolefin film can be produced at a high throughput, which has excellent film optics, i.e., removal of haziness and other distortion-producing qualities, while the tensile strength can also be increased.

While there have been described what are presently believed to be the preferred embodiments of the invention, those skilled in the art will realize that changes and modifications may be made thereto without departing from the spirit of the invention, and it is intended to claims all such changes and modifications as fall within the true scope of the invention.

I claim:

1. In a method for the production of polyethylene film by extruding molten film upwardly from an annular die in a tubular form into an extrusion zone, the improvement for providing enhanced physical properties by controlling crystalline growth comprising:

providing a water liquid quench medium maintained at a constant temperature range of from about 150° to about 200° F. in said extrusion zone immediately adjacent the annular orifice of said annular die, said temperature range being maintained by continually circulating said liquid quench medium through heating and cooling means and thence to said extrusion zone whereby the temperature of said medium is continually adjusted to said temperature range, said liquid quench medium provided on the exterior of said tubular form at a depth maintained at from about 0.25 inches to about 1.00 inches, and said liquid quench medium being circulated through said extrusion zone at a throughput rate of from about 1.5 to about 5.0 parts by weight of liquid per part of polyethylene film throughput for maintaining a maximum temperature difference between liquid medium inlet and outlet of not more than about 5° F., said liquid quench medium including coating material for depositing on said polyethylene film, extruding said molten film at a thickness of from about 0.5 mils to about 3 mils directly into said liquid quench medium over an internal mandrel, and orienting said quenched polyethylene film in a tubular bubble, whereby said polyethylene film is quenched with controlled crystalline growth.

2. The method of claim 1 wherein said maximum difference is less than 3° F. under steady state conditions.

* * * * *